United States Patent Office 3,037,007
Patented May 29, 1962

3,037,007
DISPERSING AGENTS FOR ETHYLENICALLY
UNSATURATED COMPOUNDS
Hellmut Scholz and Fritz Kieferle, Ludwigshafen (Rhine), Germany, assignors to Badische Anilin- & Soda-Fabrik Aktiengesellschaft, Ludwigshafen (Rhine), Germany
No Drawing. Filed Oct. 30, 1957, Ser. No. 693,265
Claims priority, application Germany Nov. 15, 1956
7 Claims. (Cl. 260—87.7)

The invention relates to a process for the polymerization of ethylenically unsaturated compounds in aqueous dispersions in the presence of a new dispersing agent.

It is known to carry out the polymerization of vinyl and other polymerizable compounds in aqueous suspension or emulsion in the presence of protective colloids. The polymer is thereby obtained, depending on the experimental conditions used, either as a finely divided dispersion or in the form of coarse particles which can be readily separated from the liquid phase and supplied direct to further working up after a washing and drying process.

As protective colloids there have been proposed water-soluble macromolecular compounds, as for example gelatin, polyvinyl alcohol, polyacrylic acid and its salts, methylcellulose and many other water-soluble macromolecular substances. Polymers which have been prepared by the said methods, however, have unsatisfactory processing properties in the case of vinyl chloride. The softener can only be worked in with difficulty and foils and strips prepared from this material exhibit inhomogeneities.

We have now found that especially valuable polymers with good processing properties are obtained from ethylene derivatives, especially from vinyl chloride, in aqueous suspension or emulsion by using, instead of the usual dispersing agents, a compound of the general formula:

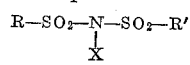

in which R and R' represent identical or different aliphatic radicals with at least 6 carbon atoms and X is a cation of an alkali metal or ammonium.

These compounds can be prepared in a simple way by the sulfochlorination of a corresponding hydrocarbon fraction according to the Fischer-Tropsch method, reacting 2 mols of the resultant sulfochloride with 1 mol of ammonia, and thereafter neutralizing the acid hydrogen attached to nitrogen with an alkali or ammonium hydroxide, as for example with caustic soda, caustic potash or ammonium hydroxide solution. Suitable compounds are for example the sodium or potassium salts of the bis-alkyldisulfonimides in which the alkyl group contains 9 to 18 carbon atoms.

The subject agents are preferably used in amounts of about 0.01 to 3 percent with reference to the weight of the monomers; when smaller amounts within this range are used, the polymers are obtained in the form of a suspension, and when larger amounts within the said range are used, the polymers are obtained in the form of fine stable dispersions. Organic catalysts such as benzoyl peroxide, lauroyl peroxide, azo-bis-isobutyronitrile, favor the formation of a suspension, while when inorganic catalysts are used, such as persulfates, perborates and hydrogen peroxide, fine stable emulsions are preferentially formed.

The ratio of water to the monomer phase can vary within wide limits; 2 to 3 parts by weight of water to 1 part by weight of monomer have proved especially favorable.

The polymerization medium can contain buffer substances, for example alkali phosphate or alkali carbonates, as well as regulators of the degree of polymerization, as for example chlorohydrocarbons, di-isopropylxanthate disulfide or dodecyl mercaptan and the like.

The compounds according to the present invention can also be used in combination with the known protective colloids, as for example with starch and the like, with surface-active synthetic emulsifying agents, as well as with insoluble suspension stabilizers, for example with finely-divided barium sulfate.

The process yields especially favorable results in the polymerization of vinyl chloride. The polyvinyl chloride thereby obtained is characterized by especially favorable processing properties and good thermal stability. In particular, by suspension polymerization there are obtained polymers with remarkably low bulk densities and these polymers may be worked up especially readily with the softener. The process, however, is generally applicable to all polymerizable ethylenically unsaturated compounds and mixtures of the same. Suitable ethylenically unsaturated compounds are for example vinylic compounds, such as vinyl and vinylidene halides, vinyl esters, acrylic esters, acrylonitrile, butadiene, styrene and derivatives of the same.

The following examples will further illustrate this invention but the invention is not restricted to these examples. The parts specified in the examples are parts by weight.

Example 1

After removal of oxygen from an enamelled autoclave by evacuation and rinsing with nitrogen, 750 parts of water, 250 parts of vinyl chloride, 0.25 part of the sodium salt of bis-alkyl-disulfonimide (alkyl=$C_9$ to $C_{12}$), 0.025 part of sodium carbonate, 1.25 parts of sodium acetate, 0.5 part of magnesium sulfate and 0.25 part of azo-isobutyronitrile are heated to 50° C. while stirring vigorously. When the pressure has fallen to 4 excess atmospheres after about 14 hours, the batch is cooled. The polymer is present as a suspension and is centrifuged, washed and dried. 220 parts of polyvinylchloride are obtained. That is about 88 percent of the theoretical yield.

The polyvinyl chloride after working up has a K-value (Fikentscher: Zellulosechemie 13, p. 58 (1932)) of 74 and a bulk density of 320 grams per litre which is very low for a suspension polyvinyl chloride. It is therefore eminently well suited for being worked up with softeners because it absorbs the softeners very rapidly by reason of its porous nature.

65 parts of the polymer are stirred with 35 parts of diethylhexyl phthalate and kept at 120° C. in a drying cabinet for 20 minutes. There is thereby obtained a dry, free-flowing polyvinyl chloride granulate which can then be worked up on a worm extrusion machine at 160° C. to a smooth ribbon practically free from nodules. If this test is carried out with a polymer which has been polymerized in the presence of 0.25 part of polyvinyl alcohol (instead of the sodium salt of bis-alkyldisulfonimide) a product is obtained with a bulk density of 580 grams per litre which under the same conditions yields an extruded ribbon with a rough surface which is permeated by numerous nodules.

To test the thermal stability, 20 grams of each of the two polymers is heated to 110° C. for 100 minutes in a drying cabinet. The polymer with the sodium salt of the bis-alkyldisulfonimide shows only a slight discoloration after the said thermal treatment whereas the comparative polymer with polyvinyl alcohol as dispersing agent is a markedly discolored violet.

Example 2

100 parts of water, 0.05 part of potassium persulfate, 0.25 part of acid sodium pyrophosphate, 1 part of the sodium salt of bis-alkyl-disulfonimide (alkyl=$C_9$ to $C_{12}$) and 50 parts of styrene are introduced into a stirring vessel and after expelling the oxygen by nitrogen, the materials are heated under reflux while stirring moderately first for 2 hours at 70° C. and then for another 2 hours at 95° C. A 29 percent dispersion of polystyrene with a K-value of 76.5 is obtained.

*Example 3*

In an enamelled stirring autoclave, after removing the oxygen by evacuation and rinsing with nitrogen, 18,000 parts of fully desalted water, 120 parts of the sodium salt of a bis-alkyldisulfonimide (alkyl=$C_{16}$ to $C_{18}$), 24 parts of sodium tripolyphosphate, 36 parts of hydrogen peroxide (35 percent), 6 parts of potassium persulfate and 6000 parts of vinyl chloride are polymerized at 48° C. with moderate stirring. After 6 hours the pressure has fallen to 4 excess atmospheres and the stirring autoclave is cooled. A 21 percent dispersion of polyvinyl chloride with the K-value 70 is obtained.

*Example 4*

The polymerization is carried out as in Example 1 but instead of the vinyl chloride there is polymerized a mixture of 225 parts of vinyl chloride and 25 parts of vinyl acetate. After polymerization for 12 hours, the pressure has fallen to 2 excess atmospheres and the batch is cooled. The copolymer of 95 parts of vinyl chloride and 5 parts of vinyl acetate obtained has a K-value of 66.

*Example 5*

8000 parts of fully desalted water, 1700 parts of vinyl chloride, 300 parts of vinylidene chloride, 2 parts of the sodium salt of bis-alkyldisulfonimide (alkyl=$C_{12}$ to $C_{15}$), 4 parts of secondary sodium phosphate and 4 parts of lauroyl peroxide are placed in a polymerization vessel as in Example 1. While stirring powerfully, polymerization is effected at 55° C. The polymerization is practically completed and the pressure fallen after 19 hours. The copolymer of 85 parts of vinyl chloride and 15 parts of vinylidene chloride obtained has a K-value of 65.

*Example 6*

15,000 parts of water, 5 parts of potassium persulfate, 10 parts of secondary sodium phosphate, 100 parts of the sodium salt of bis-alkyldisulfonimide (alkyl=$C_{16}$ to $C_{18}$) and 5000 parts of methyl acrylate are heated to 70° C. for 4 hours and polymerized in a polymerization vessel. A 23.5 percent emulsion of polymethyl acrylate with the K-value 90 is obtained.

We claim:

1. In a process for the polymerization of ethylenically unsaturated compounds in aqueous dispersion and in the presence of a polymerization catalyst, said unsaturated compounds being selected from the group consisting of vinyl chloride, vinylidene chloride, styrene, vinyl acetate, acrylonitrile and methyl acrylate, wherein the aqueous polymerization medium contains a dispersing agent, the improvement which comprises: carrying out the polymerization reaction in the presence of a dispersing agent having the formula $$R-SO_2-N-SO_2-R'$$
$$|$$
$$X$$

in which R and R' represent aliphatic radicals containing from 9 to 18 carbon atoms and X is a cation selected from the group consisting of ammonium and an alkali metal.

2. A process as claimed in claim 1 wherein the aqueous polymerization medium contains said dispersing agent in an amount of 0.01 to 3% with reference to the weight of the ethylenically unsaturated compound.

3. In a process for the polymerization of vinyl chloride in an aqueous dispersion in which the aqueous polymerization medium contains a dispersing agent and a polymerization catalyst, the improvement which comprises: carrying out the polymerization reaction in the presence of a dispersing agent selected from the group consisting of ammonium salts of bis-alkyldisulfonimides and alkali salts of bis-alkyldisulfonimides, said bis-alkyldisulfonimides containing 9 to 18 carbon atoms in each alkyl group.

4. A process as claimed in claim 3 in which vinyl chloride is copolymerized with vinylidene chloride.

5. A process as claimed in claim 3 in which the sodium salt of the bis-alkyldisulfonimide, which bis-alkyldisulfonimide contains 10 to 18 carbon atoms in each alkyl group, is used as the dispersing agent.

6. A process as claimed in claim 3 in which the salt of said bis-alkyldisulfonimide is used in an amount of 0.01 to 3% with reference to the weight of vinyl chloride.

7. In a process for the copolymerization of vinyl chloride with other polymerizable compounds in an aqueous dispersion the improvement which comprises carrying out the copolymerization in the presence of a dispersing agent of the formula $$R-SO_2-N-SO_2-R'$$
$$|$$
$$X$$

in which R and R' represent aliphatic radicals with 9 to 18 carbon atoms and X is a cation of an alkali metal.

References Cited in the file of this patent

UNITED STATES PATENTS

| | | |
|---|---|---|
| 2,259,180 | Schoenfeld et al. | Oct. 14, 1941 |
| 2,468,111 | Robertson | Apr. 26, 1949 |
| 2,673,194 | Grim | Mar. 23, 1954 |

FOREIGN PATENTS

| | | |
|---|---|---|
| 757,603 | Germany | Apr. 28, 1952 |